United States Patent Office 3,592,710
Patented July 13, 1971

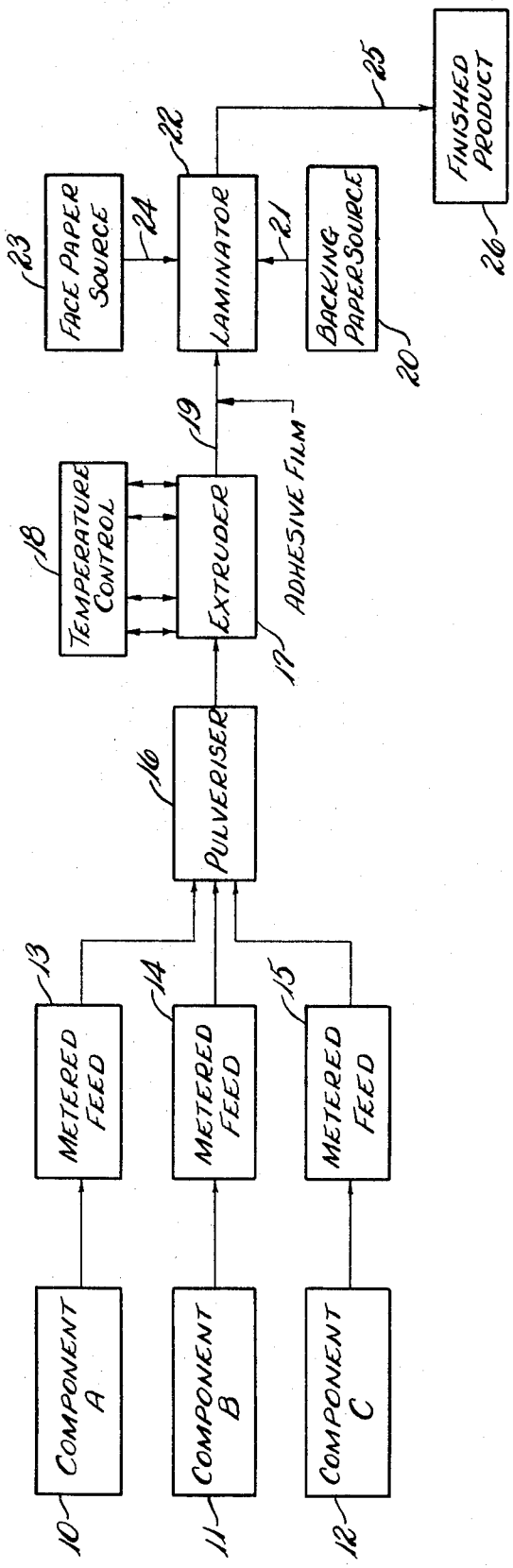

---

3,592,710
METHOD OF PRODUCING PRESSURE SENSITIVE ADHESIVES
William J. Yurgen and John M. Questel, Cuyahoga Falls, Ohio, assignors to Morgan Adhesive Company, Stow, County of Summit, Ohio
Continuation-in-part of application Ser. No. 574,721, Aug. 24, 1966. This application Sept. 18, 1969, Ser. No. 864,936
Int. Cl. B32b 31/00
U.S. Cl. 156—153
16 Claims

ABSTRACT OF THE DISCLOSURE

This method to make an adhesive comprises blending and grinding a mixture of styrene-butadiene copolymers with a solid tackifying material, feeding the pulverized mixture to an extrusion means, and processing and extruding the mixture to form a film of pressure sensitive adhesive as a viscoelastic fluid under controlled temperature conditions above the melting point of the copolymers.

---

This is a continuation-in-part of our prior application Ser. No. 574,721, filed Aug. 24, 1966, now abandoned.

The present invention relates to pressure sensitive adhesives, and particularly to a novel and improved method of mixing and forming a layer of pressure sensitive adhesive material which normally would be bonded to and/or carried by a base sheet.

BACKGROUND OF INVENTION

Heretofore most pressure sensitive adhesives have been made by grinding or breaking up the solid ingredients of the adhesive and then dissolving them in a suitable solvent which is next coated onto a substrate by any of several known means. The solvent is subsequently evaporated by heat and a film of adhesive is deposited on the substrate. In other instances, the ground ingredients of the adhesives are mixed or blended, usually with a liquid component being present in the mix. This mixture, or organisol, is then coated onto a substrate by calender rolls. In some instances, the adhesive may then be heated to aid in drying the adhesive mix which is then ready for storage or for use, as desired.

In both of the above-identified methods for forming pressure sensitive adhesive products, certain disadvantages exist in that in the solution casting of the adhesive, the formation of the adhesive requires some appreciable time in dissolving the ingredients, and subsequently the solvent is evaporated and lost. Also, the use of the solvent, which normally is flammable, is a safety hazard. In the calendering operation, the liquid materials added to the adhesive normally detract from the adhesive's overall physical properties.

The general object of the present invention is to provide a new and improved method of forming pressure sensitive adhesives by an extrusion action and wherein the components of the adhesives, whether wet or dry, can be blended, and heated above the melting points of some or all of the adhesive components and then be extruded through a forming die to form the desired adhesive layer.

Another object of the invention is to provide a rapid method of compounding, blending and mixing adhesive forming ingredients and then depositing the mixed and blended adhesive components as a substantially homogeneous sheet or layer onto a desired carrier medium without the use of any carrier or dissolving solvents in the process.

Another object of the invention is to provide a method of forming a new and improved adhesive film that has high tack, peel and creep resistant values, which method has a high productivity rate and forms the desired adhesive at low cost by substantially conventional apparatus.

A specific object of the invention is to provide a novel and improved method for forming pressure sensitive adhesives from materials, particularly elastomers, that have some degree of thermoplasticity in such elastomers and which method includes extruding the adhesive mixture under temperature controlled conditions.

Another object of the invention is to provide a double faced adhesive laminate by an improved efficient process.

The foregoing and other objects and advantages of the present invention will be made more apparent as the specification proceeds.

Attention is directed to the accompanying drawing wherein the single figure illustrates in diagrammatic form a flow sheet illustrating the steps of the method of the invention.

With reference to the details of the structures indicated in the drawing, a plurality of suitable members such as hoppers or equivalent means are indicated at 10, 11 and 12 and such hoppers, or similar units, receive different individual components used in forming the adhesive of the invention therein. These components would all comprise solids, normally, and thus the hopper 10 would receive component A therein, while hopper 11 has component B therein, hopper 12 component C therein, etc. for as many different components as would be required in making up the pressure sensitive adhesive and laminate of the invention. Each of the hopper members or means of the invention has an associated metered feed means indicated by the numbers 13, 14 and 15, respectively, suitably connected thereto whereby the rate of feed and/or measured quantities of each of the individual components could be either continuously fed from the hoppers, or could be intermittently fed from the hoppers, as desired, and with such metered means or feed members 13 through 15 in turn being connected through suitable pipes or other flow conduits preferably to a common pulverizer means or unit indicated by the numeral 16. In this pulverizer, a conventional mixing, breaking up or blending and initial grinding actions occur on the various dry components fed to the pulverizer 16 whereby when either the batch means fed thereto, or the continued flow of the components to the pulverizer will be such that a suitably blended, ground mixture is fed from the pulverizer 16 through a conventional flow member and such mixture is then received at the input end of a conventional extruder 17. This extruder 17 is of any desired construction and usually has a temperature control means 18 connected thereto in any suitable manner whereby the temperature of the various components of the extruder can be varied from end to end thereof, as is desired, whereby the extruder or portions thereof can either be cooled, or be heated, and enough different connections can be made from the temperature control means 18 to the extruder so that different temperature zones can be set up therein as is desired. The extruder 18 is adapted to extrude or force the blended adhesive mass therefrom in the form of an adhesive film 19, and any conventional cutter, handling means or other members may be connected to and associated with the extruder 17 for processing the adhesive film 19.

In order to build up a useful structure from the adhesive film 19, a suitable backing paper source 20 is provided. This source 20 usually would comprise a roll of suitable backing paper of any conventional type and which feeds a backing sheet, usually paper, 21 from the source or supply means 20, which paper is fed into a conventional or other laminator 22, such as two heated pressure rolls, to which the adhesive film 19 is also introduced. A laminate is formed in the laminator 22 from the backing paper 21, the layer of pressure sensitive adhesive film 19, and a face paper source 23. Again, this source 23 may comprise a suitable roll of any desired type of paper 24 or equivalent means used in forming a useful laminate, and normally one or both faces of a sheet of the paper 21 and one face of the paper 24 fed from the face paper source 23 would have a layer of conventional silicone or other release material appearing thereover, which layer of release material would be presented to the laminator 22 in a suitable manner for being positioned immediately adjacent and providing a temporary bond to one surface of the pressure sensitive adhesive film 19. The ultimate laminate produced by the laminator 22 is indicated by the number 25 and it can then be passed to any desired roll or storage means 26 whereby the laminate 25 of the invention then can be used at any desired later time in any suitable manner and any required printing operations or other known steps such as cutting or slitting the laminate may be performed thereon to present the laminate 25 in suitable condition for use.

It is a particular feature of the invention that the pressure sensitive adhesive of the invention as embodied in the film 19 has improved properties in relation to previous efforts made in providing pressure sensitive adhesives in other manners. In all events, the adhesive of the invention has high tack strength, good peel strength, and very effective, acceptable or strong resistance to creep. Furthermore, the present invention provides this pressure sensitive adhesive at a high productivity rate where the extrusion of the adhesive film is performed under controlled temperature conditions.

It will be appreciated that the pressure sensitive adhesive of the invention can be made having substantially conventional compounding ingredients therein, but with the synthetic rubbers, or elastomers, or equivalent substance used in the practice of the invention being of certain predetermined types, and particularly being elastomers that have a high degree of thermoplasticity therein. The pressure sensitive film of the invention in effect is formed from viscoelastic means or substances as they are rubber-like, or elastic in a fluid form under normal room temperatures. The pressure sensitive adhesive film 19 also is made from ingredients which will wet the adhering surfaces at room temperature in contrast to heat sensitive types of adhesive which will not have this characteristic.

These elastomers used to form viscoelastic fluids in the pressure sensitive adhesive must have a high viscosity at room temperature so as to have the desired creep resistance strength. However, the elastomers also must have low viscosities when melted.

In making the adhesives of the invention, it has been found that mixtures of certain percentages by weight of a mono-terminal block stereo-regular solution polymerized styrene-butadiene rubbery copolymer with a di-terminal material known as "Kraton 101" or "Kraton 1101" made by the Synthetic Rubber Division of Shell Chemical Company, of Torrance, Calif., has been found to contain 51.75% trans-1,4; 9.97% vinyl-1,2 and 38.2% cis-1,4 configuration by weight and was found to be useful in the novel process for making adhesives of this invention. Such synthetic rubber, or elastomer is a copolymer, which may be made in accordance with the process disclosed in U.S. Pat. No. 3,231,635. Any conjugated diene of 4 to 8 carbon atoms of which butadiene-1,3 is an example of a 4 carbon diene may be copolymerized with a vinyl substituted aromatic hydrocarbon in which the vinyl group is attached to a nuclear carbon atom and of which styrene is an example. The styrene-butadiene copolymer may contain about 5 to 15% vinyl, about 30 to 60% cis and about 30 to 60% trans-configuration. These copolymers also have the ability to exhibit both plastic and elastomeric properties, and have two terminal polystyrene blocks in the copolymer molecule.

The adhesive also contains major quantities of a mono-poly-styrene terminal block molecule, stereoregular styrene-butadiene copolymer resulting from the solution polymerization of a mixture containing approximately 76.5 parts of butadiene and approximately 23.5 parts of styrene. An example of such mono-terminal block copolymer which has been found useful in the practice of the invention is Solprene 1205 which is a product of Phillips Petroleum Company, Rubber Chemicals Division, Bartlesville, Okla.

The Solprene 1205 has a terminal block of polystyrene present therein and center blocks of polybutadiene and/or butadiene-styrene copolymer and it contains 57.1% trans-1,4; 9.38% vinyl-1,2 and 33.55% cis-1,4- configuration by weight. By X-ray diffraction spectrographic analysis, it has been determined that the copolymer referred to hereinbefore has the desired thermoplastic regions and also has elastomeric regions. The polymerization of the mono-terminal block copolymer is carried out by the process disclosed in British Pat. No. 888,624, and its formulation is also described therein.

The elastomers used can be ground to fine particles and have definite melting points in the range of 140° to 165° due to the presence of polystyrene blocks.

In general, a blend of the styrene-butadiene copolymers referred to is used to make the adhesive by the present invention.

Usually tackifying materials, such as resins, that are compatible with both of the copolymers used in the adhesive, add materially to the desired properties of the resultant adhesive. These resins are believed to be soluble copolymers because of their amorphous properties. Certain rosin acid derivatives may also be used as the tackifying materials and polar type resins are believed to be better in the practice of the invention although some essentially non-polar resins may also be used. It is possible to add more resins by weight and get the desired properties in the adhesive, particularly in the tack thereof, if the first resin used does not work satisfactorily by itself. In general, any of the common tackifiers for styrene-butadiene rubbery copolymers would be suitable in practice of the invention.

It will be realized that any desired quantities of any other suitable compounding ingredients may be present in the adhesive, such as antioxidants, antiozonants, ultraviolet light absorbers, plasticizers and fillers may be added, as desired, in accordance with conventional compounding practices in the adhesive industry if such materials can be ground into small particles.

One specific example of a preferred composition for the adhesive to be made by the invention is as follows:

|  | Parts by weight |
|---|---|
| Solprene 1205 | 70 |
| Kraton 101 | 30 |
| Pentalyn H | 85 |

In the formula, the percentage by weight of the ingredients present may be varied between the following ranges and still attain a satifactory adhesive:

|  | Parts by weight |
|---|---|
| Solprene 1205 | 90–50 |
| Kraton 101 | 10–50 |
| Pentalyn H | 50–150 | but 50 to 95 parts by weight Pentalyn H is preferred.

Pentalyn H is a pentaerythritol ester of hydrogenated rosin and is provided by the Hercules Chemical Company. Other resins that have proven satisfactory in the percentages by weight as indicated hereinabove include any one or more of the following: polyterpene, coumarone-indene, rosin acid, vinyl toluene/alpha methyl styrene, natural fossil, terpene phenolic, hydrocarbon, ester of polymerized rosin, ester of hydroabietyl alcohol, ketone resin, and chlorinated polyphenyl.

The copolymers described have been very effective in the practice of the invention. Other solution polymerized styrene-butadiene copolymers having similar physical characteristics but made with from about 5 to 50 parts by weight of styrene and with from about 90 to 50 parts by weight of butadiene may also be used in making the adhesive.

All of the elastomers used in practice of the invention must be able to be made permanently tacky and be able to be ground to fine particle size.

Usually the adhesive film 19 would have a thickness of from about .001 to about .020" and preferably about .003 to .005". The film may be extruded somewhat thicker than its final thickness and to be drawn down to a desired size.

In the extrusion means 17 shown in the drawings, it is important that the temperature therein be properly controlled. Thus, under the extrusion conditions for the present invention, the temperature reached in such extrusion means for the extruded material may be about 400 °F. Usually the extrusion screw is cooled and the extrusion die and extruder barrel are heated.

In making an adhesive film from the preferred composition given hereinbefore, the extrusion screw was cooled to about 60° F. and the extrusion die was heated to about 400° F. The extruder barrel is divided into several temperature zones with the input end being heated to appreciably above the melting temperatures of the components of mix and with the barrel discharge end zone being heated to about 350° F. A uniform pressure sensitive adhesive film is formed at an efficient rate of flow through the extruder. The intimate mixing and blending of the components of the pressure sensitive adhesive film in the extruder partially solubilizes the elastomers present in the tackifier resin so that the elastomers are present as viscoelastic fluids in the film produced.

A non-woven fibrous mat, or similar means, such as an open woven fabric, can be laminated with the film 19 by suitable heat and/or pressurizing means, such as a pair of rolls at the laminator 22, between which the film and the web or fabric would be introduced. The backing sheets 21 and 24 would also be fed to the laminator 22 which would force the adhesive film 19 into and through the fibrous mat to leave an adhesive layer on both surfaces thereof. A laminate of a unitary construction wherein a double-sided pressure sensitive unit is formed can thus be provided. In forming such unit, the fibrous mat usually would be engaged with the plastic film prior to the engagement of the backing sheets with the film and mat. The film 19 formed by extrusion in accordance with the principles of the invention can also be laminated with a film of a heat sensitive adhesive, if desired. These laminates can be then further processed, stored, or used in any conventional manner. Other suitable materials, as desired, can be laminated with the film 19.

"Kraton 101" is now called "Kraton 1101."

The invention provides an improved, novel process for making very desirable pressure sensitive adhesives in film form, which adhesives have high tack, peel and creep values, so that the objects of the invention are achieved.

While several complete embodiments of the invention have been disclosed herein, it will be appreciated that modification of these particular embodiments of the invention may be resorted to without departing from the scope of the invention.

What is claimed is:

1. An improved process for making a pressure sensitive adhesive having high peel and tack strength, high creep resistance, and good shelf life, comprising the steps of mixing about 90 to 50 parts by weight of a mono-terminal polystyrene block stereo-regular styrene-butadiene elastomer, about 10 to 50 parts by weight of a di-terminal polystyrene block stereo-regular styrene-butadiene elastomer, and about 50 to 150 parts by weight of a solid tackifier resin material which is compatible with said elastomers, all of said materials being in the form of small particles, blending and extruding such materials as a pressure sensitive adhesive film under temperature controlled conditions above the melting points of said elastomers, and laminating the pressure sensitive adhesive film to a second sheet or film of material.

2. The process of claim 1 which comprises squeezing the extruded film into and through a second film which comprises non-woven fabric by the use of heated pressure means.

3. The process of claim 1 which comprises squeezing the extruded into a second sheet which comprises fabric.

4. The process of claim 2 which comprises squeezing the extruded film into a second sheet which comprises fabric.

5. A process as in claim 1 where about 70 parts of the mono-terminal polystyrene block elastomer are present, about 30 parts of the di-terminal polystyrene block elastomer and about 85 parts of the resin are present.

6. A process as in claim 1 where the resin is a pentaerythritol ester of hydrogenated rosin.

7. A process as in claim 1 where the film is extruded at about 400° F.

8. A method of making a pressure sensitive adhesive comprising the steps of grinding and blending a mixture that consists essentially of measured quantities of mono-terminal and di-terminal polystyrene block styrene-butadiene copolymers, that can be made permanently tacky, and a solid tackifying material to reduce the particle size thereof, feeding the pulverized mixture to an extrusion means, further mixing, blending, grinding and heat the materials by the extrusion means, extruding a film of pressure sensitive adhesive as a viscoelastic fluid under controlled temperature conditions above the melting point of the copolymers, and laminating the film of pressure sensitive adhesive by pressure with a second sheet or film of material to form a laminate sheet including at least two plies having adjacent surfaces contacting each other.

9. A process of claim 8 which comprises the step of passing the film of pressure sensitive adhesive and the second sheet through a pair of heated rolls to squeeze the film into and through the second sheet, which comprises a non-woven fabric.

10. The process of claim 8 which comprises heating the extruded film while applying pressure thereto to force it into a fabric which is said second sheet.

11. A method of making a pressure sensitive adhesive as in claim 8 including the steps of laminating said film of pressure sensitive adhesive with the second sheet by passing them through a pair of heated rolls, and providing a third sheet adjacent the other surface of said pressure sensitive adhesive film, and passing said third sheet through said rolls with the other sheets to obtain a three ply laminate sheet.

12. A method of making a pressure sensitive adhesive as in claim 8 including the step of drawing said film of pressure sensitive adhesive to a thinner thickness prior to said laminating step.

13. A method of making a pressure sensitive adhesive comprising the steps of forming a mixture that consists essentially of measured quantities of mono-terminal and di-terminal polystyrene block styrene-butadiene copolymers, that can be made permanently tacky, and a solid tackifying material, heating the mixture to form a visco-elastic fluid condition, extruding the visco-elastic fluid under controlled temperature conditions above the melting point of the copolymers to form a film of pressure sensitive adhesive, and laminating the film of pressure sensitive adhesive by pressure with a second sheet or film of material to form a laminate sheet including at least two plies having adjacent surfaces contacting each other.

14. A process as in claim 13 for the formation of an adhesive product comprising the step of forming said second sheet or film from a heat sensitive adhesive.

15. The process of claim 13 which comprises the step of using a release coated paper sheet to form said second sheet or film of material and applying the pressure sensitive film to the release coated surface of the paper.

16. A method of making a pressure sensitive adhesive as in claim 13 including the steps of laminating said film of pressure sensitive adhesive with said second sheet by passing them through a pair of heated rolls, and providing a third sheet adjacent the other surface of said pressure sensitive adhesive film, and simultaneously passing said third sheet through said rolls with the other sheets to obtain a three ply laminate sheet at least one of which is a release coated paper sheet having the release coat in contact with said film of pressure sensitive adhesive.

References Cited

UNITED STATES PATENTS

| | | | |
|---|---|---|---|
| 3,445,319 | 5/1969 | Dawbarn | 156—244X |
| 3,448,000 | 6/1969 | Paquin et al. | 156—244X |
| 3,449,187 | 6/1969 | Bobkowicz | 156—244X |
| 3,470,055 | 9/1969 | Wale | 156—244 |
| 3,498,865 | 3/1970 | Paquin et al. | 156—244 |

BENJAMIN R. PADGETT, Primary Examiner

S. J. LECHERT, JR., Assistant Examiner

U.S. Cl. X.R.

156—62.2, 229, 244, 306